United States Patent [19]

Kuivalainen

[11] Patent Number: 5,238,657
[45] Date of Patent: Aug. 24, 1993

[54] METHOD AND APPARATUS FOR PURIFYING FLUE GASES

[75] Inventor: Reijo Kuivalainen, Karhula, Finland

[73] Assignee: A. Ahlstrom Corporation, Karhula, Finland

[21] Appl. No.: 862,380

[22] Filed: Apr. 2, 1992

[30] Foreign Application Priority Data

Apr. 4, 1991 [FI] Finland .................................. 911613

[51] Int. Cl.⁵ .................................. B01D 53/34
[52] U.S. Cl. .................................. 422/172; 239/57;
239/58; 239/79; 239/106; 239/112; 239/114;
261/117
[58] Field of Search ............... 239/566, 602, 104, 112,
239/533.13, 57, 58, 79, 106, 114; 261/117;
422/172, 220, 221, 139, 140, 145; 134/117;
55/302

[56] References Cited

U.S. PATENT DOCUMENTS

| | | | |
|---|---|---|---|
| 2,551,538 | 1/1951 | Hensel | 239/566 |
| 3,186,644 | 6/1965 | Ross et al. | 239/533.13 |
| 3,599,877 | 8/1971 | Goldschmied | 239/566 |
| 4,486,201 | 12/1984 | Noguchi | 55/302 |
| 4,632,679 | 12/1986 | Klimczak | 55/302 |
| 4,948,295 | 8/1990 | Pramsolen | 239/566 |

FOREIGN PATENT DOCUMENTS

WO91/12876 9/1991 World Int. Prop. O. .

Primary Examiner—Robert J. Warden
Assistant Examiner—Christopher Y. Kim
Attorney, Agent, or Firm—Nixon & Vanderhye

[57] ABSTRACT

Nozzles are provided for spraying a wetting medium into the gas flow in an activating reactor. The nozzle comprises a nozzle body having a plurality of nozzles The nozzle body is surrounded by a flexible and/or porous casing and a conduit introduces a gaseous medium into the casing. The gas can be introduced in either pulses or continuously. The gas introduced in pulses causes the casing to change its form and, where a perforated or porous casing is used, the continuous gas flow forms a protective gas film around the casing, thus removing the solid material accumulated on the casing.

18 Claims, 4 Drawing Sheets

METHOD AND APPARATUS FOR PURIFYING FLUE GASES

BACKGROUND AND SUMMARY OF THE INVENTION

The present invention relates to apparatus and methods for purifying flue gases. The present invention relates specifically to a nozzle apparatus in a gas conduit or in an activating reactor for spraying a wetting medium, such as water, water vapor or other wetting liquid into the gas flow. The nozzle apparatus comprises a nozzle body arranged in the gas conduit or activating reactor, the nozzle body being provided with at least one, preferably several, nozzles for spraying the wetting medium into the gas flow.

More specifically, the present invention relates to a nozzle apparatus suitable for use with different gas purification methods in connection with combustion, gasification or chemical or metallurgical processes. Sulphur oxides, ammonium, chlorine and fluorine compounds and condensable hydrocarbon compounds are typical impurities of gases formed in these processes. The gases are purified, e.g., by adding an absorbent and/or reagent reactive with the impurities into the gases during either the actual process or during the purifying stage subsequent to the process. The reagent or absorbent is activated during the purifying stage by leading the gases through an activating reactor, in which both the gases containing impurities and the reagents and/or absorbents are wetted with water or water vapor sprays from the nozzle apparatuses. Water or water vapor sprays form a wetting zone in the reactor, and the reagents or absorbents are activated in the wetting zone. After the purifying stage the completely or partly reacted reagent and/or absorbent particles are separated from the gases. Alkali metal or alkali earth metal carbonates, oxides or hydroxides, for example, are used as reagents and/or absorbents.

It is well known, that combustion of fossil fuels forms flue gases containing sulphur oxides, which in turn cause acidifying of the environment. The sulphur content of the flue gases varies depending on the sulphur content of the fuel. Methods to utilize fuels of greater sulphur content are being examined, even though the sulphur emission restrictions are being tightened. Waste incineration plants, the number of which is increasing, also form sulphur containing flue gases that will have to be purified so as to meet the acceptable emission levels. The flue gases from waste incineration plants contain, besides $SO_2$- and $SO_3$- emissions also, e.g. when combusting plastic compounds, hydrochloride and hydrofluoride acids and other harmful gaseous and solid compounds.

The process gases formed in different gasification processes can also contain harmful amounts of sulphuric or other compounds that have to be removed from the gases prior to further treatment of the gases.

Several methods have been developed for reducing sulphur emissions from combustion plants. A recent development in the flue gas purifying field has been the so-called semi-dry scrubbing method, in which a fine alkali suspension, e.g. a calcium hydroxide suspension, is sprayed through nozzle apparatuses into a hot flue gas flow in a contact reactor where the sulphur dioxides dissolve in water, and as the suspension dries, are bound to the lime compound. The water is evaporated in a contact reactor so that a solid residue is formed, whereby the reaction products of e.g. sulphur and lime are easily separable from the gases with a filter. There is a tendency to try to maintain the calcium hydroxide suspension at such a concentration that the water can be evaporated therefrom by the heat of the flue gases. A concentrated lime suspension, nevertheless, easily forms layers on the reactor walls and specially in the vicinity of the injection nozzles, which can finally be clogged.

The semi-dry method is preferable for the process because the impurities can be removed from the gases as solid waste, the disadvantage of the method nevertheless being the difficulty of controlling the process.

It has been previously suggested that the limestone is added straight into the actual combustion or gasification stage, whereby the limestone is calcined into calcium oxide according to the following reaction:

$$CaCO_3 \rightarrow CaO + CO_2$$

Calcium oxide can react already in the combustion stage with the sulphur dioxides formed therein as described by the formula
$CaO + SO_2 + 1/2 O_2 \rightarrow CaSO_4$.

But as the reactions advance, the calcium oxide particles are covered by layers of calcium sulphate or calcium sulphite which impede the sulphur from penetrating into the particles and thereby slow down and finally prevent all reactions between sulphur and lime. Thus lime does not react completely and is thereby not optimally utilized. Other factors, such as Ca/S mole ratio, temperature and retention time do also have an effect on sulphur absorption. It is, however, known that the reactivity of alkali compounds increases in relation to the proximity of dew point. The increased reactivity is due to the fact that in a wet particle the reactions take place in water phase as fast ion reactions. Close to the dew point the particles remain wet and therefore also their reactivity remains good for a longer period. Therefore, it has been suggested that the gases should be led through a wetting reactor, wherein water or water vapor sprays maintain the particles preferably wet enough for the water to surround the particles and also to penetrate into them. As the water penetrates into the lime particles, the sulphate or sulphite layer formed around the particles breaks and thus new reactive lime surface is exposed. The sulphur dioxide dissolves from the gases into the water and reacts with the calcium compounds in liquid phase on the surface of the particles.

Finnish patent application FI 900915 discloses a wetting reactor in which the particles are dry when discharged therefrom, even though the gas flow is wetted to very close to the dew point, even as close as 0°-20° C. from the dew point. According to the method the gases to be purified are introduced into the wetting reactor into at least two levels. In the wetting reactor the gases flow upwards and are exhausted from the upper portion of the wetting reactor. The gases are introduced into the wetting reactor so that a first portion of the gases is introduced into the wetting zone, in which the gas suspension formed of gas and reagent and/or absorbent is wetted with water and/or water vapor. A second portion of the gases is introduced into a drying zone below the wetting zone. In the wetting zone, the particle density of the particle suspension is maintained higher than that of the gas introduced into the wetting reactor by recycling particles separated by e.g. a filter in the upper portion of the wetting reactor back to the wetting zone. Thus, an internal recycling of the reagent or absorbent particles is effected in the wetting reactor and the particle density is maintained at a relatively high level.

Water or water vapor sprays thus generate a wetting zone in the upper or central portion of the wetting reactor. Water is sprayed into the flue gases mainly from above the gas inlets by preferably downward directed water or water vapor nozzles, arranged on support members spanning the wetting reactor horizontally. The support members can act as wetting medium conduits, through which the water or water vapor is conducted to the nozzles. Usually the water or water vapor sprays are directed so as to evenly cover as large a part of the gas flow as possible.

The gas introduced below the wetting zone rises and thereby acts advantageously as so-called drying gas and is brought into contact with the wet particles flowing down through the wetting zone in order to dry them. At least a portion of the particles flowing down is then entrained with the rising drying gas and conveyed back upwards to the wetting zone whereby the unreacted reagents or absorbents are activated again and the particle density in the reactor remains high.

At least a portion of the particles, agglomerating in the wetting zone or in the filter, is conveyed through the wetting zone to the lower portion of the reactor, whereas separate particles are re-entrained by the gas flow and they are conveyed back to the upper portion of the reactor already from the wetting zone. Larger particle lumps and wet, heavy particles do not dry until in the lower portion of the reactor, where they are dried by the drying gas or by some other mixing effect.

With the method described in patent application 900915 it is possible to lower the mean temperature of the gases in the wetting reactor to about 0°–20° C., preferably to 0°–10° C., from the dew point, i.e. practically to the dew point and still avoid the disadvantages caused by too wet particles in the upper or lower portion of the reactor. The particles wetted in the wetting zone and flowing downwards are dried by the drying gas in the drying zone and do not cause any trouble in the lower portion. The differences in temperature and moisture content are because of the recycling—very small in different locations of the reactor cross-section, thereby avoiding local harmful effects caused by wet particles or water drops.

Wet particles tend, however, to stick to moist surfaces, especially in the wetting zone. The water or water vapor sprayed from the nozzles creates good conditions for the particles to stick. The cold water flowing in the nozzle means effects condensation on the outer surfaces of the nozzle means and thereby also moistening thereof. The eddy current forming round the nozzle means naturally contributes to the sedimentation of particle layers on the outer surfaces. Rather thick layers can form on the nozzle means. The layers cause difficulties in spraying water or water vapor into the gas flow, so they must be removed. The layers can even direct a water spray in the wrong direction or completely clog some of the nozzles. In addition to this, the particles thus accumulated upon the nozzle means can loosen and drop in rather large lumps and, when falling down, disturb the operation in the lower part of the wetting reactor.

The Finnish patent publication 78777 suggests arranging the nozzles in a casing to protect the nozzles from mechanical damage. The particle layers forming gradually on the casing will, nevertheless, disturb the operation and finally clog the nozzles if special measures are not taken.

An object of the present invention is to provide an apparatus for and a method of accomplishing improved purification of gases.

A special object of the present invention is to provide for a method of and an apparatus for enabling the activating or wetting reactor to function so as to minimize the above-mentioned disadvantages due to the layering of particles.

Thus, a special object of the present invention is to provide for an activating or wetting reactor, in which the fouling and clogging of the nozzle means has been minimized.

In order to accomplish the above-mentioned objects, a nozzle apparatus according to the invention is characterized in that the nozzle body belonging to the nozzle apparatus is at least partly surrounded by a flexible and/or porous casing. A conduit has been arranged for introducing gaseous medium into the casing, whereby the flexible casing is caused to change its form and/or the medium flows out of the casing through the porous walls. The change of form or the medium flowing through the casing walls removes the solids accumulated on the casing, if any.

The method according to the invention is characterized in that gaseous medium is introduced into the casing surrounding the nozzle apparatus in order to cause the casing to change its form and/or to create a gas film on the casing, the change of form removing the layer, if any, of solids accumulated on the casing or the film preventing the forming of a layer of solids on the casing.

The nozzle body comprises a conduit for introducing the wetting medium to the nozzles, the nozzle body being formed of e.g. a straight or curved tube or an elongated hollow beam, arranged to span the activating reactor horizontally, or if desired, in an inclined position, from reactor wall to reactor wall. The nozzle body can be supported straight by the reactor walls or it can be fastened to the walls with separate support members. Either one end or both ends of the nozzle body is/are provided with inlet conduits for introducing the wetting medium, such as water, water vapor etc. therein. The nozzle body can be fitted, e.g., with evenly spaced nozzles for spraying the wetting medium into the gas flow. The nozzles can be directed as desired. The spray of wetting medium can be directed downward, it can be inclined to the side, or it can be directed upward. The medium can be sprayed concurrently with the gas flow or directly or obliquely against the gas flow. The nozzles can be pressure atomizing or pneumatically atomizing.

The nozzle body does not have to be tube- or beam-shaped. It can, for example, be formed of a circular channel. The circular channel is especially applicable in a cylindrical reactor, wherein it is advantageously arranged horizontally.

The nozzle body is, according to the invention, surrounded by a casing, preventing the particles from accumulating on the actual nozzle body. The casing is either flexible or porous so as to enable the particles accumulated thereon to be removed by raising the pressure in the casing.

The casing can be formed of a flexible, gas-proof hose, such as a rubber-based fabric-covered hose, a rubbered canvas-reinforced hose or other flexible hose able to withstand chemically and mechanically the warm and humid conditions of the activating reactor. In some cases an ordinary rubber or plastic hose can be utilized.

The casing is preferably threaded over the nozzle body so that it covers substantially the whole of the body. The casing is gas-tightly sealed with e.g. hose clamps to the end plates arranged at the ends of the nozzle body, thus closing the ends of the casing. The casing is provided with openings for the nozzles so that the tips of the nozzles stick out from the casing. The openings for the nozzles are gas-tightly sealed around the nozzles.

In addition to this, the casing is provided with a conduit for introducing the gaseous medium into the casing. Preferably the medium is introduced in the casing in pulses inflating the walls of the flexible casing as the pressure increases in the casing and thereby removing the particles accumulated on the casing. The pressure in the casing can be raised to e.g. 0.1–6 bar, and in between the pulses the pressure is allowed to decrease back to the pressure prevailing in the reactor or other surroundings. Preferably, the medium causing the pressure is air, but other gases or steam can also be utilized. The pulses of compressed air are introduced into the casing at, e.g., intervals of 0.5–60 minutes, according to present need for cleaning. This solution for removing the layers of particles can simply and inexpensively be applied to numerous different reactors.

According to another embodiment of the invention the nozzle body can be surrounded by a casing made of filter material, e.g. bag filter material. Thus the casing is both flexible and porous and the cleaning is effected by both the change of form of the casing walls and the gas flowing through the walls.

If desired, the nozzle body can be surrounded by a stiffer casing, made of e.g. metal sinter, which is very durable in even corrosive conditions. The casing to be arranged on the nozzle body can be made of e.g. sintered filter tube. The accumulation of particles on a metal sinter tube can be prevented with gas sprays flowing through the sinter material. It is specially useful to use metal sinter as material for the parts prone to gather particle layers and to direct the gas sprays through the sintered material to where they are needed to remove the particles from the tube walls. The gas can be introduced into the casing as impulses or as continuous flow.

The nozzle means according to the invention minimizes or eliminates the fouling and clogging of the nozzles by preventing the accumulation of particles on the nozzle means. Thus the operation of the nozzle means and an even spraying of the wetting medium in the gas flow can be ensured. The nozzle apparatus according to the invention prevents large particle lumps from forming on the nozzle apparatus. Thus, also the disadvantages, caused by particle layers to the operation of the activating reactor, and the disadvantages, caused by large lumps to the particle circulation and to the apparatuses, mixers and conveyers possibly located at the bottom of the reactor, can be avoided. Thus a nozzle apparatus according to the invention improves and stabilizes the whole operation of the activating reactor and also provides for wetting the gas to be purified to very near the dew point, even to the dew point in the wetting zone, as large, disadvantageous lumps are not formed. In this way, the whole of the gas purifying stage is improved and process gases are exhausted cleaner than before.

When compared to prior art techniques, the absorption of sulphur is improved with a reduced consumption of lime.

The casing arranged to surround the nozzle body also protects the nozzles from mechanical damage and wear. As the nozzles are directed downward, they are protected from particles and possible particle lumps falling from the filter in the upper portion of the activating reactor.

These and further objects and advantages of the present invention will become more apparent upon reference to the following specification, appended claims and drawings.

DETAILED DESCRIPTION OF THE DRAWING FIGURES

Reference will now be made in detail to a present preferred embodiment of the invention, an example of which is illustrated in the accompanying drawings.

Figure 1:
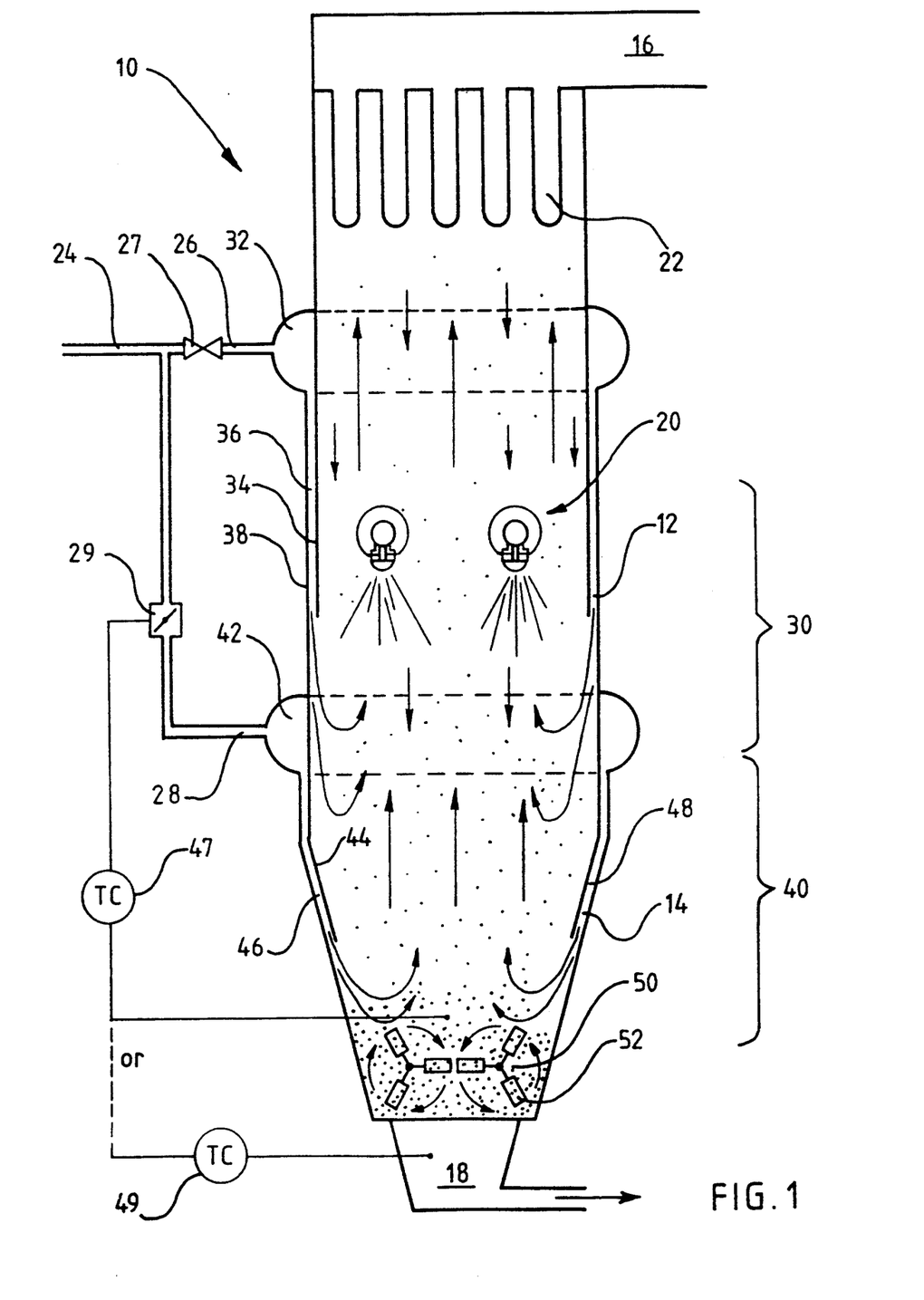
FIG. 1 is a vertical cross-sectional view of an activating reactor with a nozzle apparatus according to the invention arranged therein.

FIG. 1 shows an activating reactor 10 with gas inlets 12 and 14, a gas outlet 16 and a discharge duct 18 for the particles separated from the gas. In addition thereto the activating reactor comprises nozzle apparatus 20 for spraying water or water vapor into the activating reactor above the gas inlets. The reactor top is provided with a filter 22 for separating particles from the gas flowing upwardly within the reactor.

An activating reactor according to the invention can be arranged into a flue gas conduit after the combustor of a grate furnace, pulverized fuel furnace or a fluidized bed reactor, such as a circulating fluidized bed reactor, whereby the activating reactor is preferably arranged after the heat recovery boiler. Thus the flue gas has, prior to the activating reactor, cooled to <300° C., preferably to <150° C. Absorbent, such as limestone, has been introduced into the combustor or the fluidized bed reactor or thereafter to remove the sulphur oxides from the flue gases, the absorbent calcining in the hot flue gas to calcium oxide, which in turn absorbs sulphur as calcium sulphate and calcium sulphite. A lime/sulphur ratio of 1.5–2.1 produces a sulphur reduction of about 80–95% in circulating fluidized bed reactors. Therefore the flue gases still contain sulphur and also unreacted lime upon entering the activating reactor. An important object of the activating reactor according to the invention is to activate the lime or other absorbent so that the rest of the sulphur is removed from the flue gases.

In the embodiment shown in FIG. 1 the flue gases containing sulphur and lime are introduced into the activating reactor via duct 24. Prior to introduction into the reactor the flue gases are divided into two separate gas flows in ducts 26 and 28, wherefrom the gas flow in duct 26 is introduced into the reactor on essentially the same level as the water sprays in nozzle apparatus 20. The gas flow in duct 28 is introduced onto an essentially lower level.

The main flue gas flow is introduced into the reactor on essentially the same level as the water sprays, either above or below the sprays or on t he same level as the sprays. The essential point is to have the introduced gas well mixed with the water spray. In the embodiment shown in the Figure both the gas and the water are introduced as a downwards directed spray, the spray turning upward after a short distance from the inlet. This is to effect a swirl of gas and water spray in the wetting zone and thereby a good mixing.

The water sprays constitute a wetting zone 30 into the activating reactor, in which zone the flue gases are wetted and cooled as near to their dew point as possible, preferably to about 0°-3° C. from their dew point. In the wetting zone the lime particles are wetted, whereby sulphur is absorbed by the particles and fast ion reactions can happen in a liquid phase.

In the embodiment shown in FIG. 1 the flue gas is introduced into the reactor as jacket flow. From the duct 26 the gas is firstly led into an annular conduit 32, wherefrom the gases are led into a conduit 36 formed in connection with the reactor wall 34. The reactor walls are arranged so that the flue gas inlet conduit 36 is defined within the reactor walls 34 and 38. From the conduit 36 the flue gases are introduced via openings 12 to the wetting zone 30 inside the reactor.

The gas is correspondingly introduced from the lower gas duct 28 to the annular channel 42 surrounding the reactor and therefrom further to a downward directed duct 46 defined within the reactor walls 44, the flue gases flowing from the duct into a so-called drying or mixing zone 40 at the bottom of the reactor.

The flow of gas into the reactor can be regulated with e.g. dampers 27 and 29 in ducts 26 and 28. The gas flow can also, if desired, be regulated with an adjustable opening 48 in the duct 46.

The amount of drying gas introduced into the drying zone is preferably adequate to maintain the particles collecting in the lower portion of the reactor mainly dried. The temperature in the lower portion of the reactor is kept above the dew point for effecting an efficient drying. The gases flow upward from the drying zone, thus drying the particles flowing down from the filter and from the wetting zone. The volume of the flow of drying gas can be regulated automatically with the means 47 and 49, according either to the temperature of the gas in the lower portion of the reactor or to the temperature of the discharged particles.

The lower portion of the reactor is additionally provided with mechanical mixers 50, the number of which in the embodiment shown in the Figure is two, and which consist of mixers provided with blades 52, the mixers lying at the bottom of the reactor. The mixers break the particle lumps falling to the lower portion of the reactor and at the same time maintain a steady temperature and humidity among the particles. The blades of the mixer are preferably arranged so as, while rotating, to convey the particles to the particle discharge duct 18 of the lower portion of the reactor. The particles are preferably discharged over an over-flow plate, not shown in the Figure. Thus a "buffer", necessary for maintaining an even temperature and humidity among the particles in the reactor, is formed of the particles.

Figure 2:
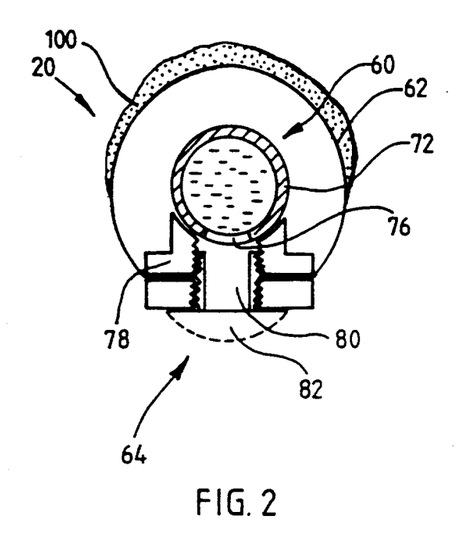
FIGS. 2 and 3 are enlarged cross-sectional views of a nozzle apparatus as illustrated in FIG. 1.
Figure 3:
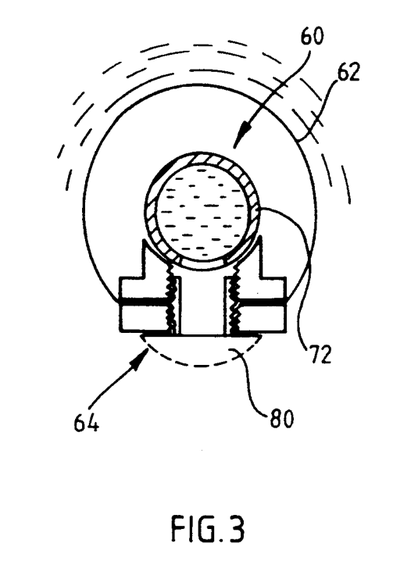
Figure 4:
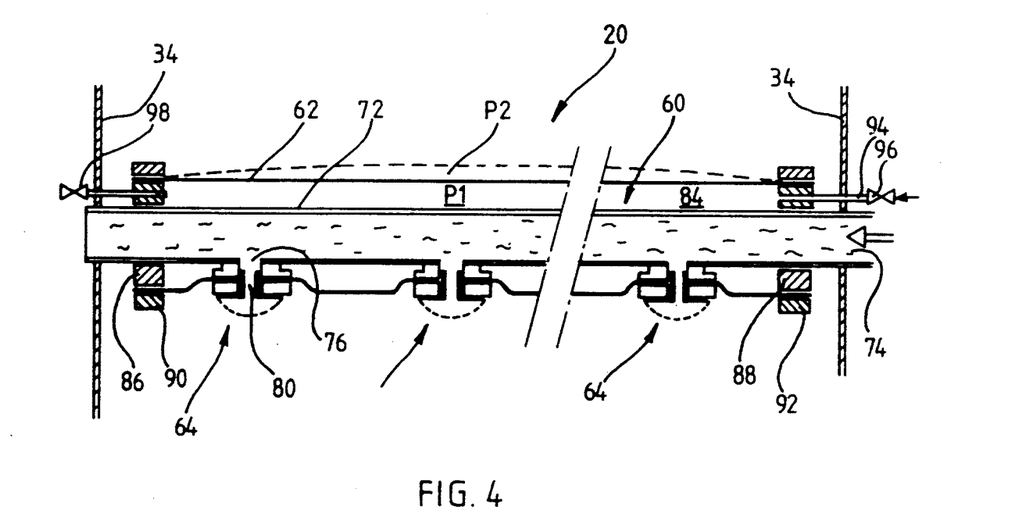
FIG. 4 is a longitudinal cross-sectional view of a nozzle apparatus as shown in FIG. 2 with portions broken out for clarity.

FIGS. 2 and 3 are enlarged views of a cross-section of a nozzle apparatus as shown in FIG. 1. FIG. 4 is a longitudinal cross-section of a nozzle of FIGS. 1 and 2. The figures illustrate a nozzle body 60, surrounded by a flexible hose-like casing 62. The nozzle body forms a conduit for introducing the wetting medium into the reactor. Nozzles 64 are spaced one from the other along nozzle body 60 and are in communication with the nozzle body.

The nozzle body is an elongated hollow beam or tube 72, wherein the wetting medium is introduced via inlet 74. Openings 76 have been formed into the tube, and the nozzles 64 are connected to the openings with conduits 78 for introducing the wetting medium from the tube to the nozzle. The tube-like casing is also provided with openings 80 for the nozzles. The nozzles are arranged into the openings so that the tip 82 of the nozzle is outside the casing. The size of the droplets distributed by the nozzles spraying the wetting medium is small, preferably $<100$ $\mu$m. The nozzles distribute the spray in a wide angle so that the sprays cover the cross-sectional area of the reactor and the gas flow as well as possible. Preferably the wetting zone covers in the reactor a vertical zone corresponding to the hydraulic diameter of the reactor.

The tube-like casing, threaded over the tube forming the nozzle body, forms a closed chamber 84, the ends of which are formed by end plates 86 and 88. The hose-like casing is sealed at its both ends with hose clamps 90 and 92. The edges of the openings 80 formed for the nozzles are gas tightly sealed between the conduit 78 and nozzle 64.

Gas is introduced into the chamber 84 formed by the hose like casing via conduit 94 for increasing the pressure in the chamber. The pressure can be increased in impulses from e.g. normal pressure $p_1$ to a higher level $p_2$ by opening and closing the valve 96. The pressure can also be decreased by opening the conduit 98 at one end of the chamber, the conduit being fitted with a valve for closing.

The pressurized gas can also be allowed to escape outside the reactor, or inside the reactor through a continuously open conduit.

In the situation shown in FIG. 2 the chamber is in normal pressure $p_1$. The hose-like casing can be slightly depressed because of the particle layer 100 accumulated on the casing. In the situation shown in FIG. 3 the pressure in the chamber has been increased instantaneously to pressure $p_2$, whereby the walls of the chamber have inflated, thus releasing the layer from the top of the casing. The inflated chamber walls have also been shown in FIG. 4.

Figure 5:
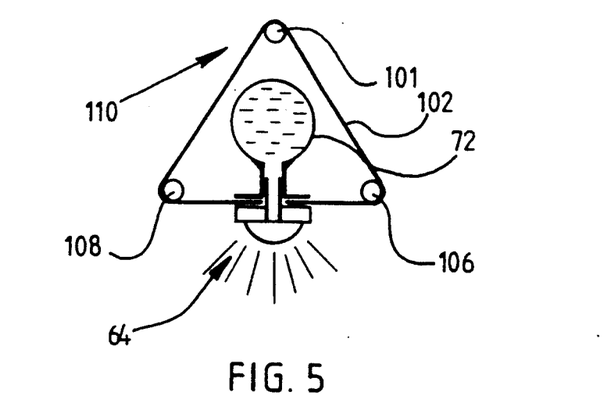
FIG. 5 is a cross-sectional view of another embodiment of a nozzle apparatus according to the invention.

The hose-like casing 62 according to the invention does not have to be tube- or bag-like, but its cross-section can be square, rhombic, polygonal, or, e.g., triangular, as shown in FIG. 5. A hose-like casing as shown in FIG. 5 is stretched around a cage formed by three tubes 101, 106 and 108. Thus the hose-like casing is in the shape of a triangular polygon, one of the angles 110 of which is directed upward. Thus the upper part of the casing forms a peak such that there are no surfaces where the particles can easily be accumulated.

Figure 6:
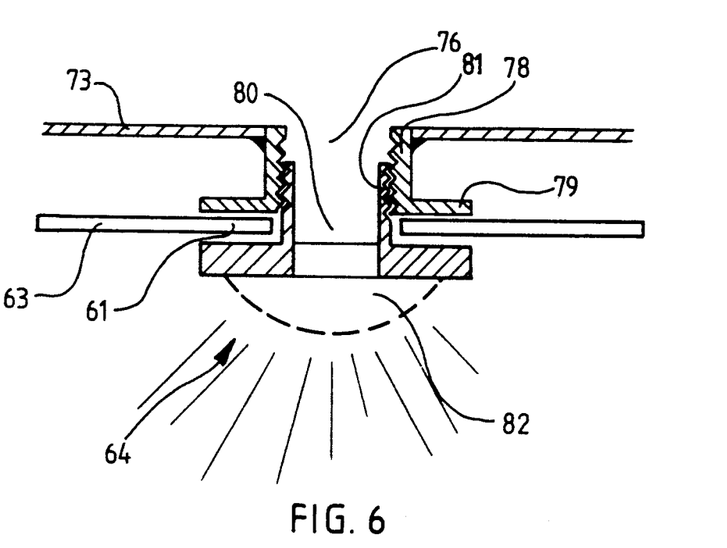
FIGS. 6 and 7 are enlarged cross-sectional views of the nozzles lead-through through the wall of a casing according to the invention.
Figure 7:
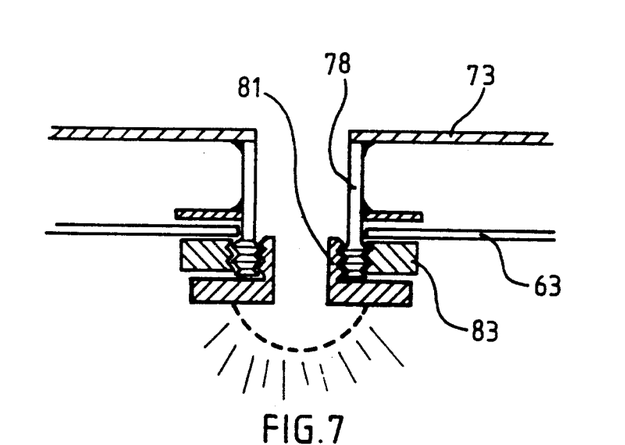

FIGS. 6 and 7 show two slightly different solutions for fastening the nozzles to the nozzle body and for sealing the nozzles to the hose-like casing. A tube-like conduit 78 is welded to the opening 76 located at the wall 73 of the nozzle body, a flange being fastened to the free end of the conduit. The flange forms a base plate 79 for the seal. The conduit 78 is provided with interior threads. The nozzle 64 has a tube-like body 81 with exterior threads. A flange forming the crown plate 83 of the seal is fastened to the nozzle end of the body of the nozzle. The body of the nozzle is arranged to pass through an opening 80 formed at the wall 63 of the hose-like casing and it is threaded to the thread of the conduit 78 so that the edges 61 of the opening in the hose-like casing are tightly fastened between the base plate 79 and the crown plate 83, thus sealing the opening gas-tightly.

FIG. 7 presents another solution for sealing the opening of the hose-like casing at the circumference of the nozzles. In the FIG. 7 embodiment the free end of the conduit 78 is provided with both interior and exterior threads and the conduit passes through an opening 80 at the wall 63 of the casing. A flange, forming the base plate of the seal is welded near the middle of the conduit so that the flange is located inside the casing. The crown plate 83 is threaded onto the exterior threads of the free end of the conduit 78 so that the edges of the opening in the hose-like casing are sealed between the base plate 79 and the crown plate 83. The actual nozzle is provided with a threaded body 81 so that it can be fastened to the interior threads of the conduit 78. If needed, the nozzles are easily replaceable.

Figure 8:
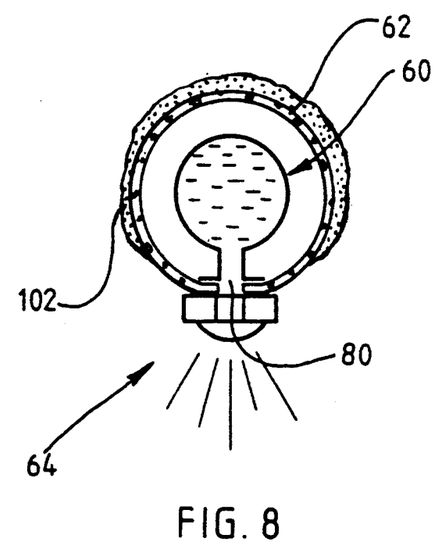
FIGS. 8 and 9 are cross-sectional views of two additional embodiments of nozzle apparatus according to the invention.

There is no intent to limit the invention to embodiments in which the nozzle body is surrounded by a flexible hose-like casing. As FIG. 8 illustrates, the casing can be formed of a stiffer porous material, such as filter tubes. The Figure illustrates a nozzle body 60, around which is arranged a casing 62 formed of porous material. The porous material can be e.g. metal sinter or other porous material that can be welded to the nozzle body. Openings 80 have been formed at the walls of the porous casing for the nozzles 64. Gas can be introduced continuously to the casing so that a gas film 102 is formed around the casing, the gas film preventing the particles from setting on the casing. The gas can, nevertheless, also be introduced in pulses to reduce the consumption of gas.

Figure 9:
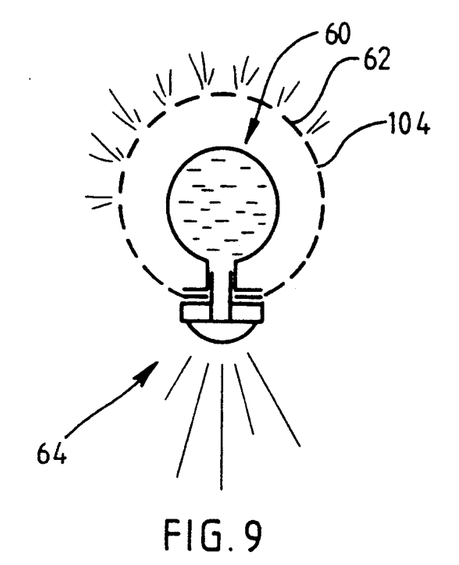

FIG. 9 illustrates a nozzle apparatus, in which the casing 62 is made of a perforated metal sheet. The walls of the casing are provided with holes 104 through which the pressurized gas flows, keeping the surface of the casing free of particle layers.

The nozzle body illustrated in FIG. 4 is a straight beam or tube. There is no intent to limit the invention to this embodiment, but the nozzle body can be e.g. annular, as shown in FIG. 10.

Figure 10:
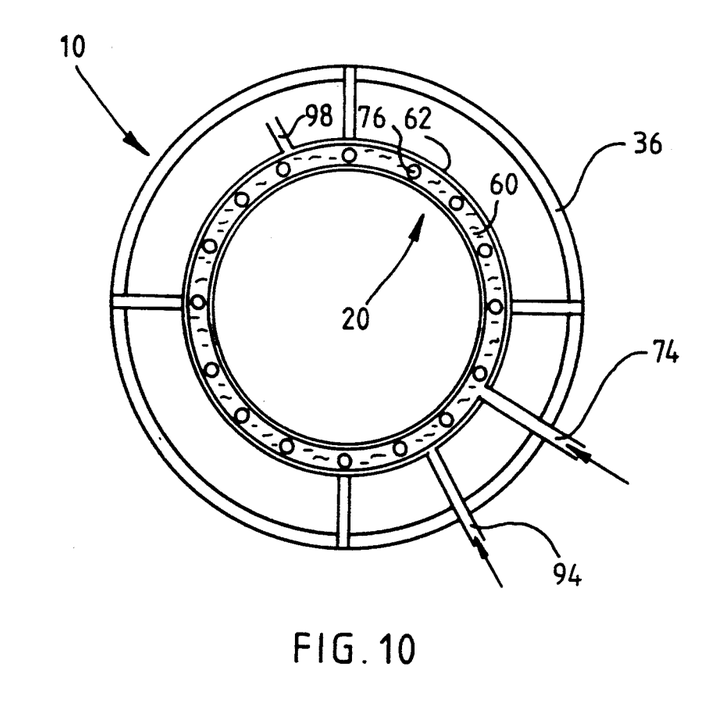
FIG. 10 is a schematic horizontal cross-sectional view of an activating reactor with an annular nozzle body arranged therein.

FIG. 10 illustrates a horizontal cross-section of an activating reactor 10, with an annular nozzle body 60. The nozzle body 60 is surrounded by an annular casing 62. The nozzle body is also provided with openings 76, to which the nozzles are fastened. The wetting medium is introduced into the nozzle body 60 through conduit 74 and the gas for pressurizing the casing 62 is introduced through conduit 94.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

I claim:

1. A nozzle apparatus for use in a gas conduit or an activating reactor for spraying a wetting medium, such as water, water vapor or other wetting liquid into a gas flow, the nozzle apparatus comprising:
   a nozzle body for receiving the wetting medium and disposition in the gas conduit or activating reactor, the nozzle body having at least one nozzle for spraying the wetting medium into the gas flow;
   a flexible casing surrounding said nozzle body spaced apart from said nozzle body to define a space, said one nozzle extending form said nozzle body and through an opening in said casing;
   means for flowing a gaseous medium into said space about said nozzle body to effect a change of form in the flexible casing for removing any solid material accumulated on the casing; and
   means for isolating the flow of the wetting medium through said nozzle body and said one nozzle from the flow of the gaseous medium into said space.

2. A nozzle apparatus as recited in claim 1, wherein said nozzle body is in the shape of an elongated horizontal tube.

3. A nozzle apparatus as recited in claim 1, wherein said nozzle body is in the shape of a horizontal annular channel.

4. A nozzle apparatus as recited in claim 1, wherein said one nozzle is disposed on a lower portion of the nozzle body.

5. A nozzle apparatus as recited in claim 1, wherein said nozzle body is sealingly gas-tightly surrounded by said flexible casing.

6. A nozzle apparatus as recited in claim 1, wherein said nozzle body is surrounded by a tube formed of a flexible rubber-based material.

7. A nozzle apparatus as recited in claim 1, wherein said flexible casing is formed of a porous, non-flexible metal sinter.

8. A nozzle apparatus as recited in claim 1, including a plurality of nozzles, said flexible casing being provided with openings for the nozzles fastened to the nozzle body.

9. A nozzle apparatus as recited in claim 8, wherein the openings of said casing have edges sealed about the circumference of the nozzles.

10. A nozzle apparatus for use in a gas conduit or an activating reactor for spraying a wetting medium, such as water, water vapor or other wetting liquid into a gas flow, the nozzle apparatus comprising:
   a nozzle body for disposition in the gas conduit or activating reactor and for receiving a flow of wetting medium, the nozzle body having at least one nozzle for spraying the wetting medium into the gas flow;
   a porous casing surrounding said nozzle body, said one nozzle extending from said nozzle body and through an opening in said casing; and
   a conduit for introducing a gaseous medium into said casing about said nozzle body, independently of the flow of wetting medium, to effect a gas flow through the porous walls of said casing to the exterior of the casing for removing any solid material accumulated on the casing.

11. A nozzle apparatus as recited in claim 1, wherein said nozzle body is in the shape of an elongated horizontal tube.

12. A nozzle apparatus as recited in claim 1, wherein said nozzle body is in the shape of a horizontal annular channel.

13. A nozzle apparatus as recited in claim 1, wherein said casing is formed of a porous, non-flexible metal sinter.

14. A nozzle apparatus as recited in claim 1, wherein said casing is formed of a perforated metal sheet.

15. A nozzle apparatus as recited in claim 1, including a plurality of nozzles, wherein the porous casing is provided with openings for the nozzles fastened to the nozzle body.

16. A nozzle apparatus as recited in claim 15 wherein openings of said casing have edges sealed about the circumference of the nozzles.

17. A method of maintaining a nozzle apparatus clean in a gas conduit or in an activating reactor, comprising the steps of:

providing a nozzle apparatus having a nozzle body surrounded by a flexible casing;

spraying a liquid medium carried by the nozzle apparatus into a gas flow in said gas conduit for activating an absorbent or reagent therein; and displacing any solid material accumulated on the casing by introducing a gaseous medium into a space between the casing and the nozzle body independently of spraying the liquid medium by the nozzle apparatus, thereby causing the casing to change its form.

18. A method of maintaining a nozzle apparatus clean in a gas conduit or in an activating reactor, comprising the steps of:

providing a nozzle apparatus surrounded by a porous casing;

spraying liquid medium into a gas flow in said gas conduit for activating an absorbent or reagent therein; and displacing any solid material on the casing by introducing a gaseous medium into the porous casings surrounding the nozzle apparatus independently of spraying the liquid medium by the nozzle apparatus for causing the formation of a gas film on the casing.

* * * * *